United States Patent
Chow et al.

(10) Patent No.: US 7,561,627 B2
(45) Date of Patent: Jul. 14, 2009

(54) METHOD AND SYSTEM FOR CHANNEL EQUALIZATION AND CROSSTALK ESTIMATION IN A MULTICARRIER DATA TRANSMISSION SYSTEM

(75) Inventors: Jacky S. Chow, Mountain View, CA (US); Tin-Yau Fung, San Francisco, CA (US); Pak Hei Matthew Leung, Hong Kong (HK); King-Fuk Luk, Hong Kong (HK); Francis Man-Lung Ng, Vancouver (CA); Eugene Yuk-Yin Tang, Richmond Hill (CA)

(73) Assignee: Marvell World Trade Ltd., St. Michael (BB)

( * ) Notice: Subject to any disclaimer, the term of this patent is extended or adjusted under 35 U.S.C. 154(b) by 758 days.

(21) Appl. No.: 11/031,221

(22) Filed: Jan. 6, 2005

(65) Prior Publication Data

US 2006/0146945 A1    Jul. 6, 2006

(51) Int. Cl.
*H04L 27/28*    (2006.01)
*H04M 1/00*    (2006.01)
(52) U.S. Cl. .................. 375/260; 379/413.04
(58) Field of Classification Search ................ 375/260, 375/222, 257, 219, 295, 259, 285; 379/413.04, 379/399.01
See application file for complete search history.

(56) References Cited

U.S. PATENT DOCUMENTS

| | | | |
|---|---|---|---|
| 4,238,746 A | 12/1980 | McCool et al. | |
| 4,791,390 A | 12/1988 | Harris et al. | |
| 4,811,342 A | 3/1989 | Huang | |
| 5,440,347 A | 8/1995 | Guan | |
| 5,519,730 A | 5/1996 | Jasper et al. | |
| 5,732,113 A | 3/1998 | Schmidl et al. | |
| 5,809,086 A | 9/1998 | Ariyavisitakul | |
| 5,901,180 A | 5/1999 | Aslanis et al. | |
| 5,995,568 A | 11/1999 | Molnar et al. | |
| 6,021,167 A | 2/2000 | Wu | |
| 6,134,283 A | 10/2000 | Sands et al. | |
| 6,279,022 B1 | 8/2001 | Miao et al. | |
| 6,434,119 B1 | 8/2002 | Wiese et al. | |

(Continued)

FOREIGN PATENT DOCUMENTS

EP    0 969 608 A2    1/2000

(Continued)

OTHER PUBLICATIONS

J. S. Chow et al., "Equalizer Training Algorithms for Multicarrier Modulation Systems," 1993 International Conference on Communications, pp. 761-765, Geneva, May 1993.

(Continued)

*Primary Examiner*—Khai Tran

(57) ABSTRACT

Improved techniques for concurrent channel equalization and far-end crosstalk channel compensation (e.g., estimation and/or cancellation) in a multicarrier data transmission system are disclosed. The improved techniques can produce coefficients for an electronic filter that provide channel equalization and for an electronic filter that provides cancellation of the far-end crosstalk. These coefficients can be initially trained and then subsequently updated during data transmission. Optionally, common coefficient determination resources can be utilized for both far-end crosstalk and near-end crosstalk purposes. These improved techniques are particularly suitable for use with a digital multicarrier communication system having multiple-input multiple-output systems.

38 Claims, 11 Drawing Sheets

U.S. PATENT DOCUMENTS

| | | | |
|---|---|---|---|
| 6,584,164 | B1 | 6/2003 | Tuukkanen |
| 6,735,244 | B1 | 5/2004 | Hasegawa et al. |
| 6,888,886 | B2 | 5/2005 | Ito |
| 6,928,110 | B2 | 8/2005 | Ougi et al. |
| 6,944,244 | B2 * | 9/2005 | Belotserkovsky et al. ... 375/350 |
| 6,954,421 | B2 | 10/2005 | Kuwabara et al. |
| 6,985,548 | B1 | 1/2006 | Jabbar et al. |
| 6,999,517 | B1 * | 2/2006 | Bombay et al. ............ 375/257 |
| 7,016,429 | B1 | 3/2006 | Dogan et al. |
| 7,088,782 | B2 | 8/2006 | Mody et al. |
| 7,245,674 | B2 | 7/2007 | Liang |
| 7,254,196 | B2 | 8/2007 | Kriedte et al. |
| 7,286,617 | B2 | 10/2007 | Vanderperren et al. |
| 7,426,232 | B2 | 9/2008 | Matsuoka et al. |
| 7,436,881 | B2 | 10/2008 | Nedic et al. |
| 7,453,794 | B2 | 11/2008 | Fang et al. |
| 2002/0075797 | A1 * | 6/2002 | Kilani ..................... 370/208 |
| 2002/0126768 | A1 * | 9/2002 | Isaksson et al. ............ 375/298 |
| 2004/0125862 | A1 | 7/2004 | Li et al. |
| 2004/0131011 | A1 | 7/2004 | Sandell et al. |
| 2005/0135432 | A1 | 6/2005 | Kelley et al. |

FOREIGN PATENT DOCUMENTS

| | | |
|---|---|---|
| EP | 1 035 699 A2 | 9/2000 |
| EP | 1 313 283 A2 | 5/2003 |
| EP | 1 414 208 A1 | 4/2004 |
| WO | WO 2004/028055 A1 | 4/2004 |

OTHER PUBLICATIONS

J. S. Chow et al., "ADSL Standard and Recommended Training Sequence for Time Domain Equalizers (TQE) with DMT," ANSI T1E1.4 Committee Contribution No. 93-086, Apr. 15, 1993.

John M. Cioffi et al., "G.vdsl: Digital Duplexing: VDSL Performance Improvement by Aversion of Frequency Guard Bands," ITU Temporary Document NT-041, Nashville Tennessee, Nov. 1999.

L. Hanzo et al., "Single- and Multi-carrier Quadrature Amplitude Modulation," Chapter 21, Wiley, ISBN 0471492396, 2000.

Van Acker et al., "Per Tone Equalization for DMT-Based Systems," IEEE Transactions on Communications, vol. 49, No. 1, Jan. 2001.

Van Acker et al., "Per Tone Echo Cancellation for DMT-Based Systems," IEEE Transactions on Communications, vol. 51, No. 9, Sep. 2003.

Leus and Moonen, "Per-Tone Equalization for MIMO OFDM Systems," IEEE Transactions on Signal Processing, vol. 51, No. 11, Nov. 2003.

Minn et al., "A Robust Timing and Frequency Synchronization for OFDM Systems," IEEE Transactions on Wireless Communications, vol. 2, No. 4, Jul. 2003.

Mochizuki et al., "A High Performance Frequency and Timing Synchronization Technique of OFDM," IEEE Globecom 1998, Piscataway, NJ, vol. 6, Nov. 8, 1998, pp. 3443-3448.

Platbrood et al., "Analysis of Coarse Frequency Synchronisation for Hiperlan Type-2," Vehicular Technology Conference, IEEE VTS 50$^{th}$, Amsterdam, Netherlands, Sep. 19-22, 1999, pp. 688-692.

U.S. Appl. No. 10/865,256, filed Jun. 9, 2004.
U.S. Appl. No. 10/866,327, filed Jun. 9, 2004.
U.S. Appl. No. 10/865,133, filed Jun. 9, 2004.
U.S. Appl. No. 10/865,093, filed Jun. 9, 2004.

International Search Report and Written Opinion dated Sep. 26, 2005 for corresponding PCT Application No. PCT/US2005/019986.

International Search Report and Written Opinion dated Sep. 30, 2005 for corresponding PCT Application No. PCT/US2005/020073.

International Search Report and Written Opinion dated Oct. 6, 2005 for corresponding PCT Application No. PCT/US2005/020075.

International Search Report and Written Opinion dated Oct. 6, 2005 for corresponding PCT Application No. PCT/US2005/020084.

* cited by examiner

METHOD AND SYSTEM FOR CHANNEL EQUALIZATION AND CROSSTALK ESTIMATION IN A MULTICARRIER DATA TRANSMISSION SYSTEM

CROSS-REFERENCE TO RELATED APPLICATIONS

This application is related to: (i) U.S. patent application Ser. No. 10/865,256, filed Jun. 9, 2004, entitled "TRAINING SEQUENCE FOR SYMBOL BOUNDARY DETECTION IN A MULTICARRIER DATA TRANSMISSION SYSTEM," and incorporated herein by reference; (ii) U.S. patent application Ser. No. 10/866,327, filed Jun. 9, 2004, entitled "METHOD AND SYSTEM FOR DETERMINING SYMBOL BOUNDARY TIMING IN A MULTICARRIER DATA TRANSMISSION SYSTEM," and incorporated herein by reference; (iii) U.S. patent application Ser. No. 10/865,133, filed Jun. 9, 2004, entitled "TRAINING SEQUENCE FOR CHANNEL ESTIMATION IN A DATA TRANSMISSION SYSTEM," and incorporated herein by reference; and (iv) U.S. patent application Ser. No. 10/865,093, filed Jun. 9, 2004, entitled "METHOD AND SYSTEM FOR CHANNEL ESTIMATION IN A DATA TRANSMISSION SYSTEM," and incorporated herein by reference.

BACKGROUND OF THE INVENTION

1. Field of the Invention

The present invention relates to data transmission systems and, more particularly, to multicarrier data transmission systems.

2. Description of the Related Art

A conventional voice-band modem can connect computer users end-to-end through the Public Switched Telephone Network (PSTN). However, the transmission throughput of a voice-band modem is limited to below 40 Kbps due to the 3.5 KHz bandwidth enforced by bandpass filters and codes at the PSTN interface points. On the other hand, the twisted-pair telephone subscriber loop of a computer user has a much wider usable bandwidth. Transmission systems based on local subscriber loops are generally called Digital Subscriber Lines (DSL).

One DSL technique for high-speed data communications is Asymmetrical Digital Subscriber Line (ADSL) signaling for the telephone loop which has been defined by standards as a communication system specification that provides a low-rate data stream from a residence to a telephone company's central office (upstream), and a high-rate data stream from the central office to the residence (downstream). The ADSL standard provides for operation without affecting conventional voice telephone communications, e.g., Plain Old Telephone Service (POTS). The ADSL upstream channel only provides simple control functions or low-rate data transfers. The high-rate downstream channel provides a much higher throughput. This asymmetrical information flow is desirable for applications such as video-on-demand (VOD).

An ADSL modem operates in a frequency range that is higher than the voice-band; this permits higher data rates. However, the twisted-pair subscriber line has distortion and losses which increase with frequency and line length. Thus, the maximum ADSL data rate is determined by the length of subscriber lines. The ADSL standard uses Discrete Multi-Tone (DMT) modulation with the DMT spectrum divided into two-hundred fifty-six 4.3125 kHz carrier bands and a Quadrature Amplitude Modulation (QAM) type of constellation is used to load a variable number of bits onto each carrier band independently of the other carrier bands.

Besides ADSL and its families (ADSL2, ADSL2+, all based on DMT modulations), another set of DSL technique for high-speed data communications over twisted-pair phone lines is known as Very High Speed Digital Subscriber Lines (VDSL) and VDSL2. VDSL and VDSL2 are intended to facilitate transmission rates greater than that offered by the ADSL families. The transmission schemes used with VDSL can be Discrete Multi-Tone (DMT) modulation or QAM modulation, whereas for VDSL2, its once again DMT modulation.

Digital communication systems transmit data from a transmitter over a channel to a receiver. In order to support reliable, high performance operation, digital communication systems often need to estimate the impulse response of the channel. The channel represents a communication medium from the transmitter to a far-end receiver or from the transmitter to a near-end receiver. The digital communication system can utilize the estimated channel impulse response for far-end or near-end noise cancellation schemes and far-end channel equalization.

Prior approaches to estimating a channel impulse response have been implemented in either the time domain or the frequency domain. In the case of time-domain channel estimation techniques, the estimated channel is convolved with the transmitted signal in an adaptive manner. However, such a solution produces only a single error signal that is used to update all taps of a finite impulse response filter that provides the estimated channel. This approach is complex and slow to converge.

Frequency-domain channel identification approaches are more common. One approach requires transforming time-domain signals to frequency-domain tones, training frequency-domain taps for a FIR filter that provides the estimated channel, and then finally converting the frequency-domain taps back to the time-domain channel estimate. This approach allows each tap to be independently trained and adapted in the frequency domain. However, the disadvantages of this frequency-domain approach are that additional hardware for fast Fourier transforms and inverse fast Fourier transforms are required on the receiver side, and that the training signals utilized must span the entire frequency bandwidth. Unfortunately, in some implementations of digital communication systems, there are restrictions on usage of certain frequencies for the purpose of training and thus the entire frequency bandwidth is sometimes not permitted to be used.

Another approach to estimating the channel response in the frequency domain can utilize a frequency-domain adaptive comb filter. In K. Van Acker, M. Moonen, T. Pollet, "Per-Tone Echo Cancellation for DMT-based system," IEEE Transactions on Communications, Vol. 51, No. 9 (September 2003), a per tone echo cancellation structure enables the transformation of time-domain taps to the frequency-domain adaptive comb filter taps. See also Katleen Van Acker et al., "Per Tone Equalization for DMT-Based Systems," IEEE Transactions on Communications, Vol. 49, No. 1 (January 2001). The frequency-domain adaptive comb filter taps can be directly trained to estimate the desired taps. The update of the adaptive comb filter taps for each of the frequency tones is based on an error signal.

FIG. 1 is a block diagram of a conventional per-tone channel equalizer 100. Although use of a time domain equalizer (TEQ) is common, in this embodiment, the channel equalization is performed in the frequency domain. The per-tone channel equalizer 100 includes a fast Fourier transform (FFT)

102, a scaler 104, a delay circuit 106, a subtractor 108, an adaptive comb filter 110, an adder 112, and a coefficient updating algorithm 114. Received signals, $y_n$, are passed through the FFT 102 and supplied to the delay circuit 106. The subtractor 108 forms difference signals from the received signals and the delayed received signals. The difference signals from the subtractor 108 are fed to the adaptive comb filter 110. The coefficient updating algorithm 114 updates coefficients for taps of the adaptive comb filter 110 in accordance with a decision error signal. The output of the FFT 102 is adaptively scaled by the scaler 104 which is controlled by the coefficient updating algorithm 114. The adder 112 adds the scaled signals with the output of the adaptive comb filter 110. The output of the adder 112 is the equalizer output, $Z_i$, and is calculated as $$Z_i = Y_i \cdot v_0(i) + ACF(i) \qquad \text{Equation 1}$$

where $ACF(i)$ is the adaptive comb filter output for the $i^{th}$ bin and is given by $$ACF(i) = \sum_{t=1}^{T-1} \Delta_t \cdot v_t(i) \qquad \text{Equation 2}$$

where T is the number of taps, and the difference signals are given by the following equation.

$$\Delta_i = y_{-i} - y_{N-i} \qquad \text{Equation 3}$$

In adapting the coefficients, a sequence of known training symbols is transmitted to a receiver and a Least Mean Square (LMS) based algorithm is applied to train up the coefficients. The detected error signal, $e_d(i)$, is computed as $$e_d(i) = S_d(i) - Z_i \qquad \text{Equation 4}$$

where $S_d(i)$ is the known transmitted training symbol.

The update of the tap coefficient $v_0(i)$ and the coefficients for the adaptive comb filter taps can be performed as $$v_0(i)(k+1) = v_0(i)(k) + \mu_i \cdot e_d(i) \cdot Y_i^*(k) \qquad \text{Equation 5}$$

$$v_t(i)(k+1) = v_t(i)(k) + \mu_a \cdot \Delta_t \cdot e_d(i)$$

for $t = 1, \ldots, (T-1)$ \qquad Equation 6 where $v_t(i)(k)$ is the $t^{th}$ coefficient for the adaptive comb filter taps applied to the $i^{th}$ received tone signal; $\Delta_t$ is the difference signal; $\mu_a$ is the adaptation constant; $e_d(i)$ is the error signal for the $i^{th}$ tone, computed by Equation 4; finally, k represents the symbol index.

For a multicarrier system with multiple-inputs and multiple outputs, techniques for identifying cross channel coefficients due to far-end crosstalk (FEXT) are described, for example, in Starr, Sobara, Cioffi & Silverman, "DSL Advances," Pearson Education, Inc., 2003. FIG. 2 is a block diagram of a FEXT cancellation system 200. The FEXT cancellation system 200 includes a FEXT channel estimator 202 that examines a received training sequence to adaptively estimate FEXT channel coefficients. Following training, the FEXT channel coefficients are supplied to a FEXT canceller 204 that cancels FEXT from incoming signals in accordance with the estimated FEXT channel coefficients.

Moreover, near-end crosstalk (NEXT) cancellation can also be conventionally provided. FIG. 3 is a block diagram of a NEXT cancellation system 300. The NEXT cancellation system 300 includes an NEXT channel estimator 302 and a subtractor 304. The NEXT channel estimator 302 adaptively estimates a NEXT channel. The subtractor 304 then subtracts the estimated NEXT noise from incoming signals. The NEXT cancellation process is summarized as $$E_{NEXT}(m, i) = Y_i^m - \sum_{\substack{n=1 \\ n \neq m}}^{L} G^i(m, n) \cdot X_{ne}(n, i) \qquad \text{Equation 7}$$

where $E_{NEXT}(m,i)$ is the estimated near-end crosstalk estimation error for the $m^{th}$ user at the $i^{th}$ tone, if the far-end channel is silence; $Y_i^m$ is the received signal for the $m^{th}$ user at the $i^{th}$ tone; $G^i(m,n)$ is the near-end crosstalk coefficient that couples the $n^{th}$ channel to the $m^{th}$ user channel at the $i^{th}$ tone; $X_{ne}(n,i)$ is the reference near-end transmitted signal of the $n^{th}$ channel at the $i^{th}$ tone.

The NEXT coefficients is updated as $$G^i(m,n)(t+1) = G^i(m,n)(t) + a \cdot E_{NEXT}(m,i) \cdot X^*_{ne}(n,i) \qquad \text{Equation 8}$$

where a is a small positive adaptation constant of value less than 1.

Conventionally, the training of the equalizer and the training of the FEXT estimator are performed at different times in the training protocol. If the equalizer is trained before the FEXT estimation gets started, the equalizer settings are obtained with the presence of the FEXT noise. The disadvantage in this case is that a higher noise level will slow down the equalizer training and increase the chance for mis-adjustment of the adaptive comb filter taps. On the other hand, if the FEXT estimator is trained before the equalizer, the presence of the inter-carrier interference and the inter-symbol interference disadvantageously deteriorates the FEXT channel estimation.

Thus, there remains a need for improved approaches to performing channel equalization as well as canceling interference in a digital communication system.

SUMMARY OF THE INVENTION

The invention pertains to improved techniques for concurrent channel equalization and far-end crosstalk channel compensation (e.g., estimation and/or cancellation) in a multicarrier data transmission system. The improved techniques can produce coefficients for an electronic filter that provide channel equalization and for an electronic filter that provides cancellation of the far-end crosstalk. These coefficients can be initially trained and then subsequently updated during data transmission. Optionally, common coefficient determination resources can be utilized for both far-end crosstalk and near-end crosstalk purposes. These improved techniques are particularly suitable for use with a digital multicarrier communication system having multiple-input multiple-output systems.

The invention can be implemented in numerous ways, including as a method, system, device, apparatus, or computer readable medium. Several embodiments of the invention are discussed below.

As a multicarrier data transmission system, one embodiment of the invention includes at least: a FFT unit that receives incoming time-domain symbols that have been transmitted through a communication medium and outputs incoming frequency-domain symbols; an adaptive channel equalizer that produces a noise estimate, the noise estimate pertaining to at least inter-carrier interference and inter-symbol interference; a subtractor operatively connected to subtract the noise estimate from the incoming frequency-domain symbols to produce channel adjusted symbols; a FEXT unit operatively connected to adaptively determine FEXT channel coefficients and to reduce FEXT from the channel adjusted symbols in accordance with the FEXT channel coefficients so as to produce desired symbols; and a symbol detector for examining the desired symbols to determine detected symbols.

As a multicarrier data transmission system, another embodiment of the invention includes at least: a FFT unit that receives incoming time-domain symbols that have been transmitted through a communication medium and outputs incoming frequency-domain symbols; an adaptive channel equalizer that produces a noise estimate, the noise estimate pertaining to at least inter-carrier interference and inter-symbol interference; a subtractor operatively connected to subtract the noise estimate from the incoming frequency-domain symbols to produce channel adjusted symbols; a FEXT estimator operatively connected to adaptively determine FEXT channel coefficients; a descaling unit operatively connected to scale the channel adjusted symbols to produce desired symbols; and a symbol detector for examining the desired symbols to determine detected symbols. The FEXT channel coefficients are used to produce scaling data, and the descaling unit operates to scale the channel adjusted symbols in accordance with the scaling data.

As a method for operating a multicarrier data transmission system having a training mode and a data transfer mode, where the multicarrier data transmission system includes a far-end crosstalk unit and a channel equalizer, one embodiment of the invention includes at least the acts of: placing the multicarrier data transmission system in the training mode; receiving training symbols that have been transmitted over a transmission sequence; and processing the received training symbols to concurrently train the far-end crosstalk unit and the channel equalizer.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques for concurrent channel equalization and far-end crosstalk channel compensation (e.g., estimation and/or cancellation) in a multicarrier data transmission system. The improved techniques can produce coefficients for an electronic filter that provide channel equalization and for an electronic filter that provides cancellation of the far-end crosstalk. These coefficients can be initially trained and then subsequently updated during data transmission. Optionally, common coefficient determination resources can be utilized for both far-end crosstalk and near-end crosstalk purposes. These improved techniques are particularly suitable for use with a digital multicarrier communication system having Multiple-Input Multiple-Output systems (MIMO).

Embodiments of various aspects of the invention are discussed below with reference to FIGS. 4-7B. However, those skilled in the art will readily appreciate that the detailed description given herein with respect to these figures is for explanatory purposes as the invention extends beyond these limited embodiments.

Figure 1:
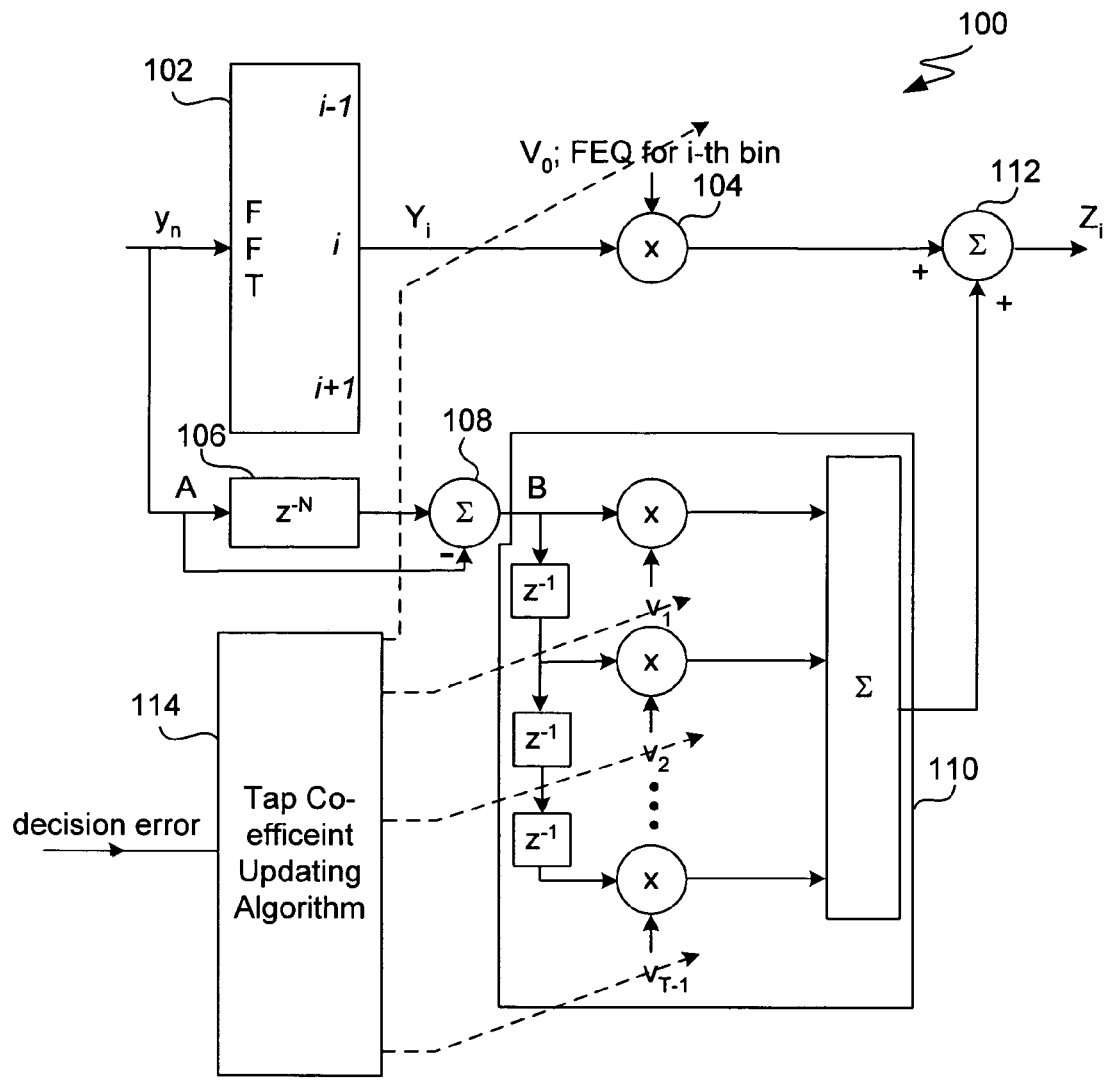
FIG. 1 is a block diagram of a conventional per-tone channel equalizer.
Figure 2:
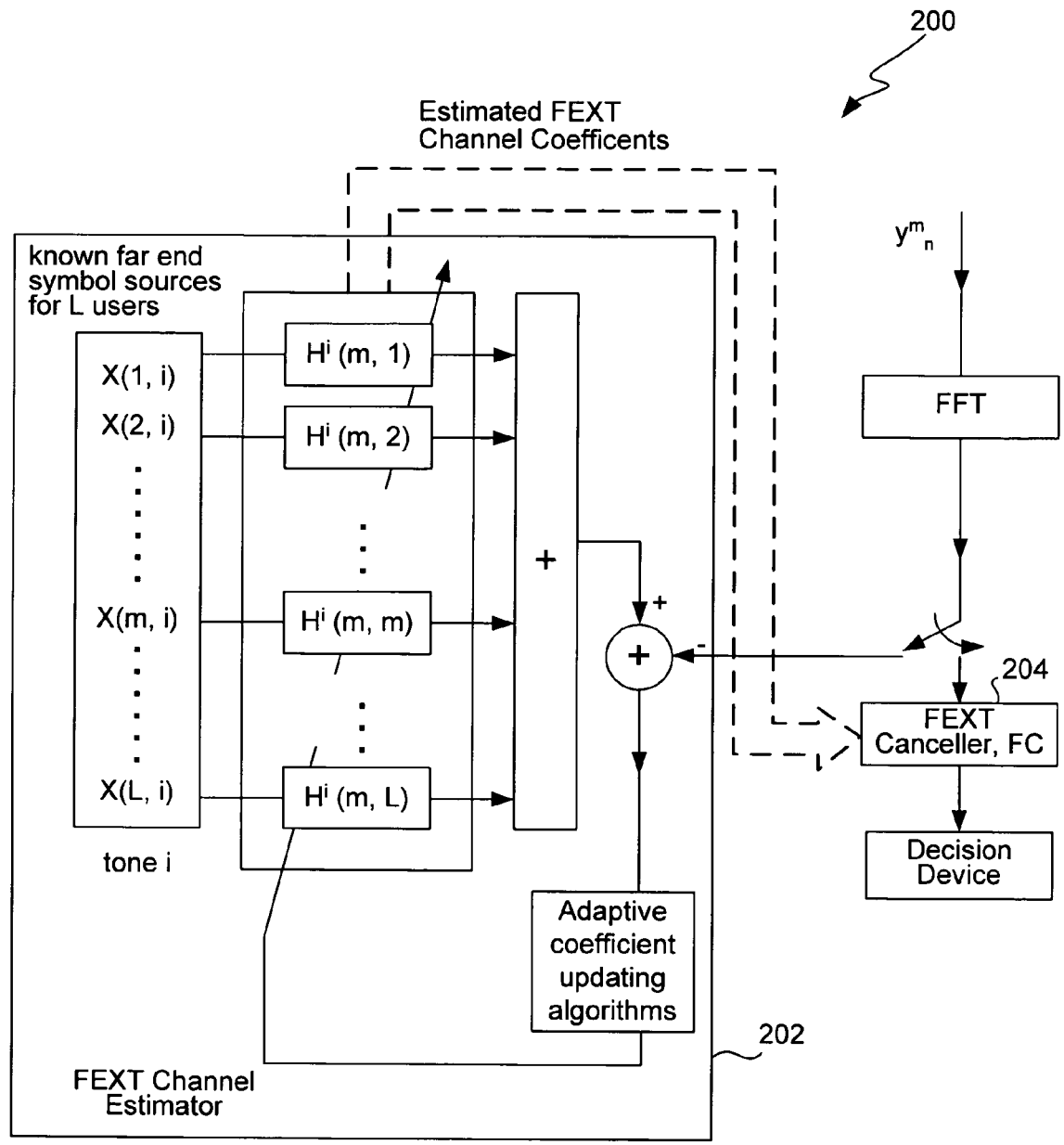
FIG. 2 is a block diagram of a FEXT cancellation system.
Figure 3:
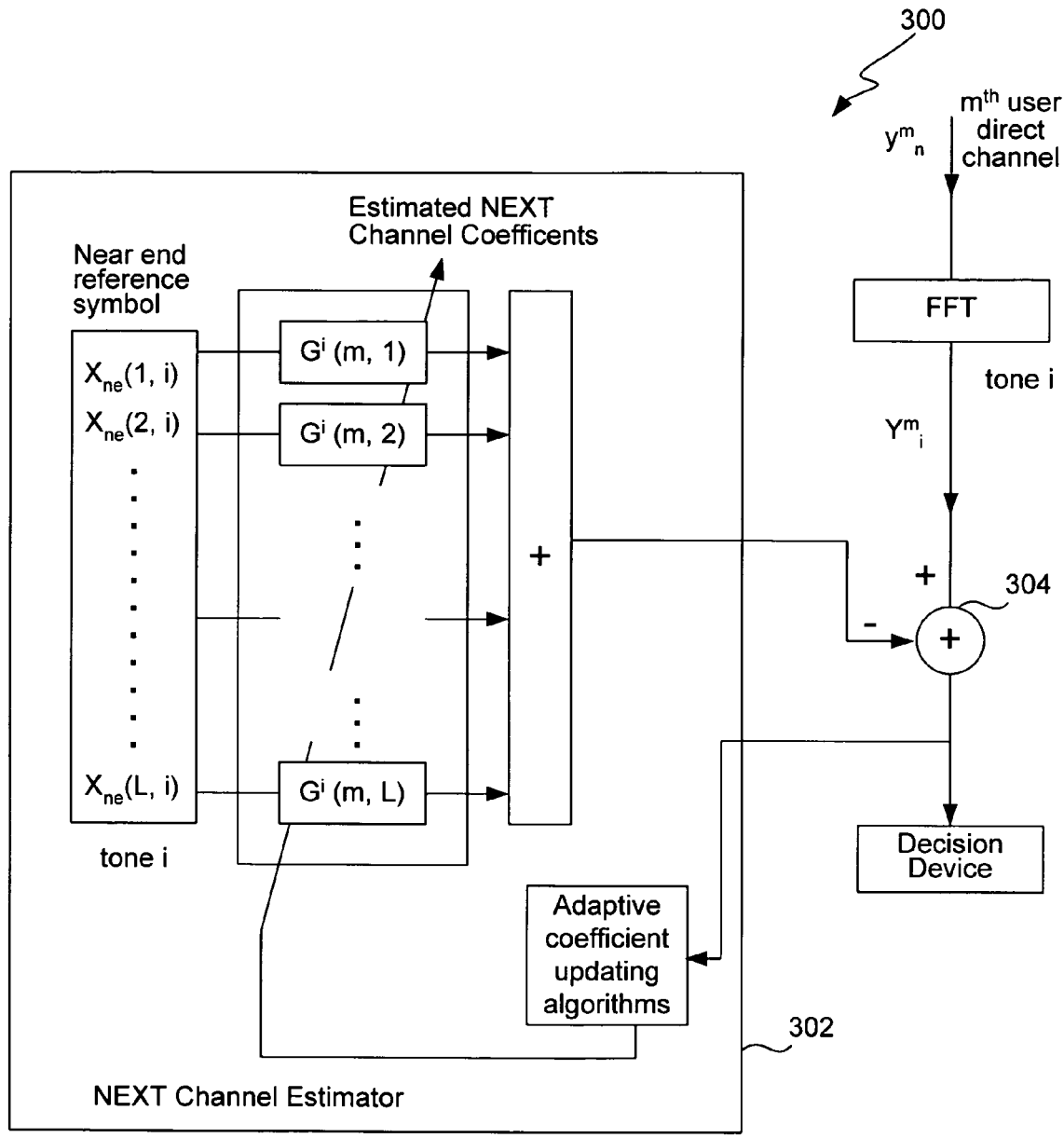
FIG. 3 is a block diagram of a NEXT cancellation system.
Figure 4:
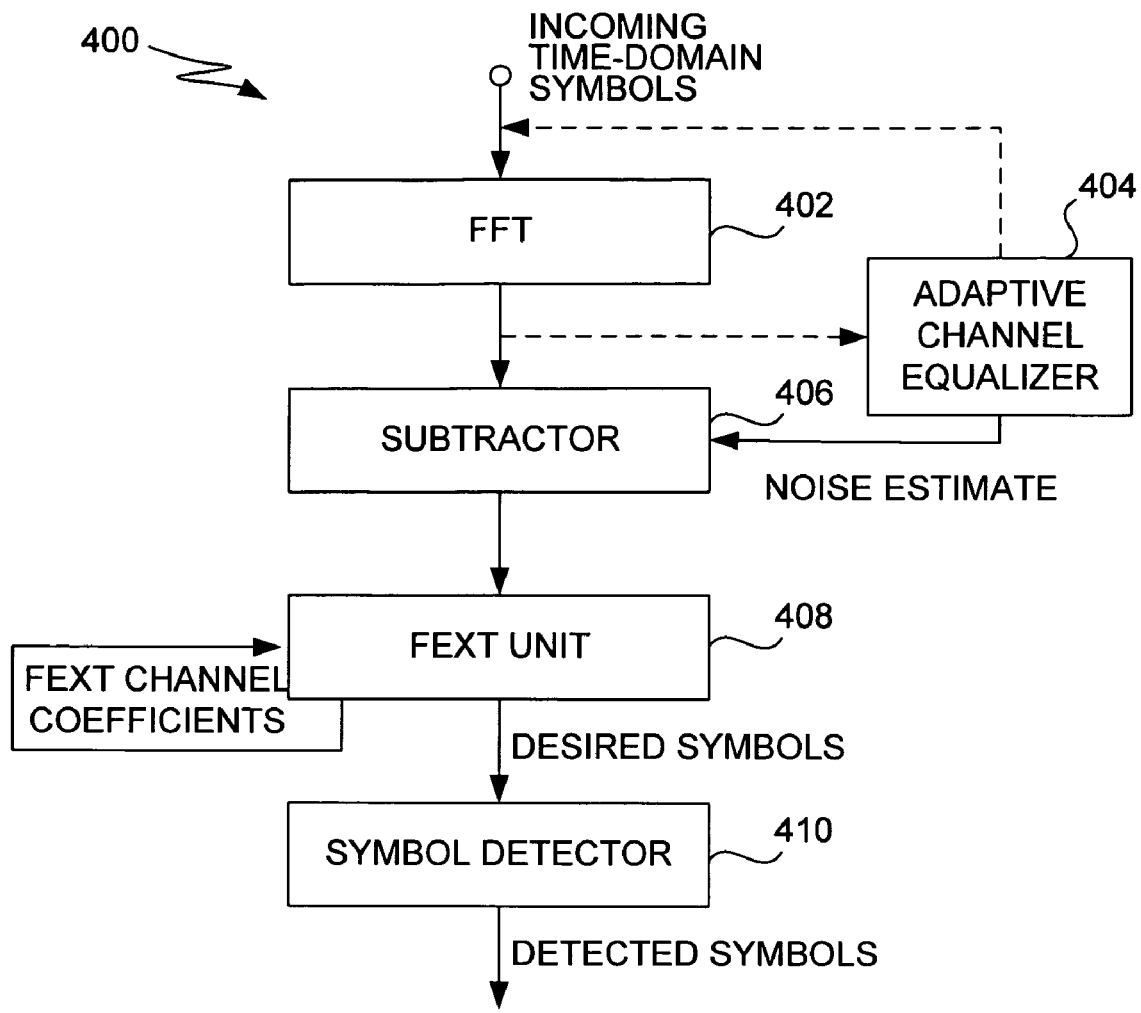
FIG. 4 is a block diagram of a multicarrier data transmission system according to one embodiment of the invention.

FIG. 4 is a block diagram of a multicarrier data transmission system 400 according to one embodiment of the invention. The multicarrier data transmission system 400 receives incoming time-domain symbols. Typically, the incoming time-domain symbols correspond to symbols that have been transmitted from a transmitter through a communication medium to a receiver. The multicarrier data transmission system 400 represents at least part of the receiver. The incoming time-domain symbols are supplied to a fast Fourier transform (FTT) 402. The FFT 402 converts the time-domain symbols into frequency-domain symbols.

An adaptive channel equalizer 404 provides a noise estimate. The noise estimate serves as an estimate of inter-symbol or inter-carrier interference. The noise estimate (part of channel equalization process) can be provided on a per-tone basis. In one implementation, the adaptive channel equalizer 404 uses a plurality of coefficients for taps of a filter in producing the noise estimate. In producing the noise estimate, the adaptive channel equalizer 404 can evaluate either the incoming time-domain symbols being received or the frequency-domain symbols output by the FFT 402.

The adaptive channel equalizer 404 supplies the noise estimate to a subtractor 406. Additionally, the frequency-domain symbols produced by the FFT 402 are supplied to the subtractor 406. The subtractor 406 subtracts the noise estimate from the incoming frequency-domain symbols. As a result, the subtractor 406 outputs modified frequency-domain symbols. The modified frequency-domain symbols include desired symbols as well as distortion due to at least far-end crosstalk. The multicarrier data transmission system 400 further includes a far-end crosstalk (FEXT) unit 408. The FEXT unit 408 receives the modified frequency-domain symbols provided by the subtractor 406. The FEXT unit 408 serves to adaptively cancel out FEXT interference from the modified frequency domain symbols to output the desired symbols. The FEXT unit 408 is able to cancel out the FEXT interference by adaptably updating FEXT channel coefficients such that the FEXT interference can be adaptably tracked and removed from the modified frequency-domain symbols. In one embodiment, the FEXT channel coefficients include at least one of direct channel coefficients and cross channel coefficients. The output from the FEXT unit 408 thus pertains to the desired symbols. Thereafter, a symbol detector 410 can evaluate the desired symbols to detect symbols, and then output detected symbols.

According to one embodiment of the invention, coefficients used in determining the channel estimate and the FEXT channel coefficients are jointly updated in an adaptive manner. By jointly updating the coefficients for the channel estimate and the FEXT channel coefficients, the ability to reduce interference is substantially increased. Additionally, joint adaptive determination of the coefficients can yield faster convergence than otherwise possible when the training for the channel estimate (e.g., equalizer taps) and the training for the channel interference (e.g., FEXT interference) is done separately.

Figure 5A:
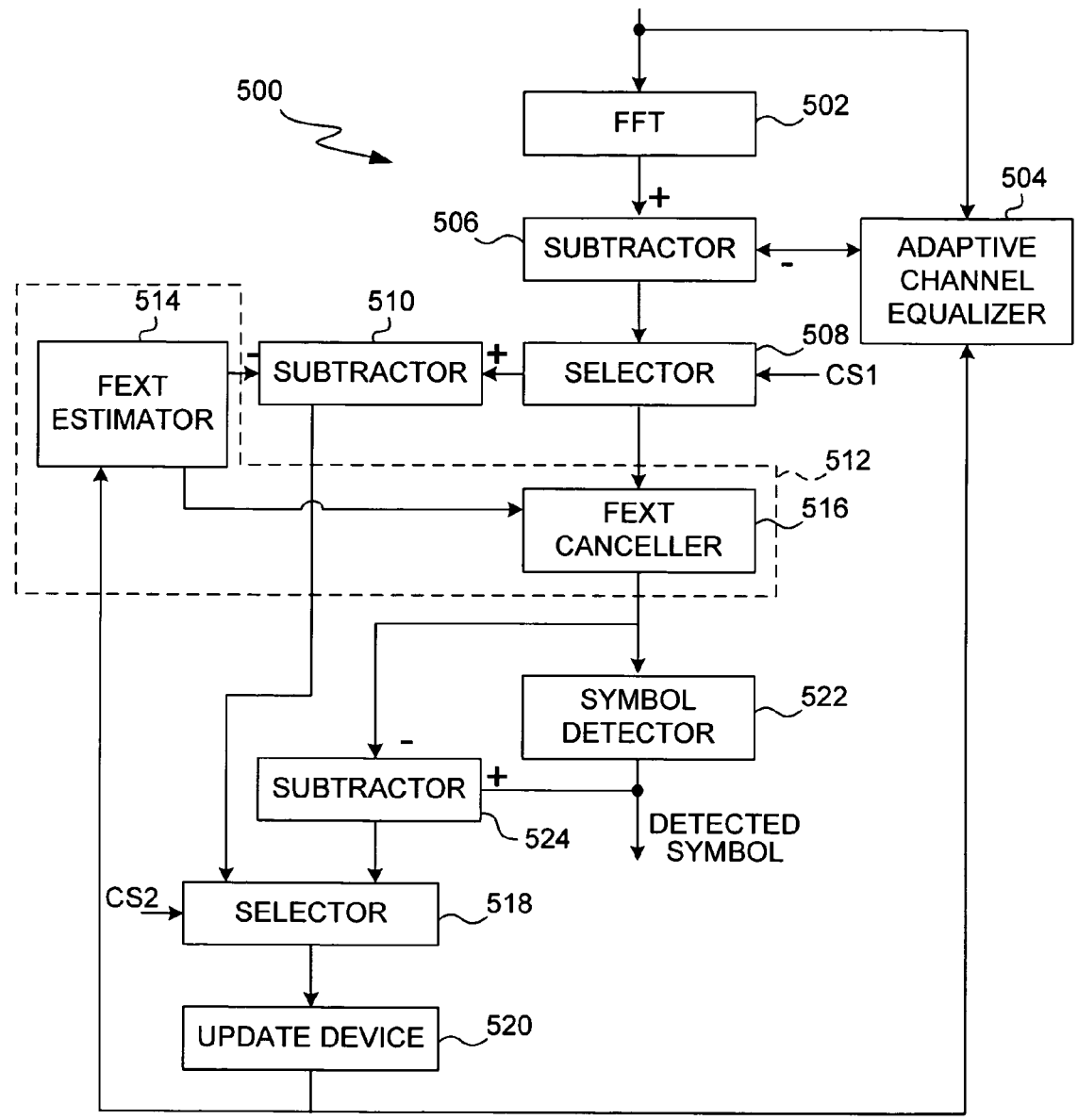
FIG. 5A is a block diagram of a multicarrier data transmission system according to one embodiment of the invention.

FIG. 5A is a block diagram of a multicarrier data transmission system 500 according to one embodiment of the invention. The multicarrier data transmission system 500 can, for example, represent a more detailed embodiment of the multicarrier data transmission system 400 illustrated in FIG. 4.

The multicarrier data transmission system 500 includes a fast Fourier transform (FFT) 502 that receives incoming time-domain symbols (e.g., signals). Typically, the incoming time-domain symbols correspond to symbols (more generally, signals) that have been transmitted from a transmitter through a communication medium to a receiver. The multicarrier data transmission system 500 represents at least part of the receiver. The FFT 502 converts the time-domain symbols into frequency-domain symbols.

An adaptive channel equalizer 504 determines a noise estimate based on the incoming time-domain signals. A subtractor 506 subtracts the noise estimate provided by the adaptive channel equalizer 504 from the frequency-domain symbols provided by the FFT 502. The output of the subtractor 506 contains the equalized symbol which is the desired signal scaled by the channel attenuation plus the interference. One type of interference that distorts the desired signals is far-end crosstalk (FEXT) interference.

The multicarrier data transmission system 500 also includes a selector 508, a subtractor 510 and a FEXT unit 512. The selector 508 can be operated under a first control signal (CS1). The first control signal (CS1) can serve as a mode selection signal. In one embodiment, the multicarrier data transmission system 500 has a training mode and a data transfer mode. In the training mode, the selector 508 supplies the equalized symbols to the subtractor 510. The FEXT unit 512 includes a FEXT estimator 514 and a FEXT canceller 516. The FEXT estimator 514 estimates FEXT interference and supplies coefficients based on such availability to provide it to the FEXT canceller 516. The subtractor 510 subtracts the FEXT estimate from the equalized symbols provided via the selector 508 to provide a training error signal.

The multicarrier data transmission system 500 also includes a selector 518. The selector 518 receives the training error signal from the subtractor 510. The selector 518 operates under the control of a second control signal (CS2). The second control signal (CS2) can serve as a mode selection signal. In one embodiment, the second control signal (CS2) is the same signal as the first control signal (CS1). In the training mode, the second control signal (CS2) causes the selector 518 to output the training error signal to an update unit 520. The update unit 520 serves to perform an adaptive algorithm, such as a LMS algorithm, to reduce the training error signal. In one embodiment, the adaptive channel equalizer 504 is implemented by a filter having a plurality of taps, each of which is controlled by a coefficient, and the FEXT estimator 514 is implemented by a filter having a plurality of taps, each of which is controlled by a coefficient. In this regard, the update device 520 can operate to update coefficients to be used by the FEXT estimator 514 as well as coefficients to be used by the adaptive channel equalizer 504. Here, the update device 520 operates to jointly update the coefficients to be used by the FEXT estimator 514 as well as coefficients to be used by the adaptive channel equalizer 504.

In one embodiment, the coefficients used by the FEXT estimator 514 include at least one of direct channel coefficients and cross channel coefficients. The multicarrier data transmission system 500 further includes a symbol detector 522 and a subtractor 524. In the data transfer mode, the selector 508 supplies the equalized symbols to the FEXT canceller 516, as opposed to the subtractor 510. The FEXT canceller 516 receives the appropriate coefficients pertaining to the FEXT interference from the FEXT estimator 514. The FEXT canceller 516 operates to cancel FEXT interference from the equalized signals in accordance with the appropriate coefficients. Hence, the output of the FEXT canceller 516 are estimated desired signals. The symbol detector 522 examines the estimated desired symbol provided by the FEXT canceller 516, and outputs a detected symbol. The subtractor 524 receives the estimated desired symbol output by the FEXT canceller 516 and the detected symbol output by the symbol detector 522. Hence, the subtractor 524 subtracts the estimated desired signal from the FEXT canceller 516 from the detected symbol output by the symbol detector 522. The output from the subtractor 524 is an error signal that is supplied to the selector 518. In the data transfer mode, the second control signal (CS2) causes the selector 518 to provide the error signal from the subtractor 524 to the update device 520. As noted previously, the update unit 520 serves to perform an adaptive algorithm, such as a LMS algorithm, to reduce the error signal. In this regard, the update device 520 can operate to update coefficients to be used by the FEXT estimator 514 as well as coefficients to be used by the adaptive channel equalizer 504. Hence, in the data transfer mode, the update device 520 also operates to jointly update the coefficients to be used by the FEXT estimator 514 as well as coefficients to be used by the adaptive channel equalizer 504, thereby allowing such coefficients to be jointly (or concurrently) optimized.

During data transmission, different QAM size symbols can be sent to the receiver. In order to use the same decision device for multi-size QAM symbols and to account for any rotation of the channel, a frequency-domain equalizer (FEQ) would conventionally be used. However, according to one embodiment of the invention, a multicarrier data transmission system can use the FEXT unit to perform the tasks (e.g., channel equalization or channel attenuation) conventionally assigned to a frequency-domain equalizer (FEQ). With the FEXT unit in place, the FEQ coefficients, which are conventionally handled separately, are absorbed into the rotation and scaling matrix used by the FEXT canceller. As a result, separate, additional hardware for frequency-domain equalization is not needed. For example, in the multicarrier data transmission system 500, the coefficients for the FEXT canceller 514 can be used to provide channel equalization or channel attenuation.

As noted above, the invention is particularly well suited for use in a MIMO system. Hence, the following detailed discussion of the multicarrier data transmission system 500 (i.e., the receiver) shown in FIG. 5A assumes a MIMO system consisting of L users, and therefore there can be up to (L−1) user-induced interfering signal sources. For the $m^{th}$ user, we denote $H^i(m,m)$ being the direct channel coefficient at the frequency bin i, and $H^i(m,l)$ being the cross-channel coefficient due to the $l^{th}$ user at the same frequency bin. In the foregoing discussion, for convenience, it is assumed that m is the user index under the analysis; i is the frequency bin index under analysis; l is other user index, i.e., l≠m; k is the time index for the $k^{th}$ DMT symbol.

The detection error, $e_{tr}(m,i)$, during training, is given by $$e_{tr}(m, i) = Y_i^m - \sum_{l=1}^{L} H^i(m, l) \cdot X(l, i) - ACF_i^m \quad \text{Equation 9}$$

where $Y_i^m$ is the received signal for the $m^{th}$ user at the $i^{th}$ frequency bin; $ACF_i^m$ is the adaptive comb filter output of the chosen user and frequency; $H^i(m,l)$ is the cross-channel coefficient from the $l^{th}$ to the $m^{th}$ user signal path at the $i^{th}$ frequency bin; and $X(l,i)$ is the $l^{th}$ user symbol.

The detection error during training, $e_{tr}(m,i)$, is obtained by subtracting the adaptive comb filter output $ACF_i^m$ and the FEXT estimator output $H^i(m,l) \cdot X(l,i)$ from the received symbol at the FFT output. With reference to FIG. 5A, the subtractor 506 operates to subtract the output of the adaptive channel equalizer 504 (e.g., the adaptive comb filter output $ACF_i^m$) from the received symbol output by the FFT 502, and the subtractor 510 thereafter further subtracts the output of the FEXT estimator 514 (i.e., FEXT estimator output $H^i(m,l) \cdot X(l,i)$) from the output of the subtractor 506.

To update each channel coefficient at the $k^{th}$ symbol period, an adaptive approach is taken. Although the Least Mean Squares (LMS) approach is one suitable adaptive method (e.g., adaptive algorithm), other adaptive methods, such as Recursive Least Mean Squares, can be utilized. The LMS update of the coefficients is as follows:

$$H^i(m,n)(k+1) = H^i(m,n)(k) + \mu_c \cdot e_{tr}(m,i) \cdot X^*(n,i)(k) \forall n = 1, \ldots, L \quad \text{Equation 10}$$

where $\mu_c$ is a small positive adaptation constant to maintain the loop stability.

The received signal, $Y_i^m$, can be viewed as a sum consisting of the user symbol scaled by a direct channel gain term, a channel noise term due to inter-channel interference (ICI) and inter-symbol interference (ISI), an interference noise term due to other users, and a total noise term lumped with line noise and other noise sources such as RFI etc. This is expressed by the following equation.

$$Y_i^m = X(m, i) \cdot H^i(m, m) + \text{Noise}(ICI, ISI) + \sum_{\substack{l=1 \\ l \neq m}}^{L} H^i(m, l) \cdot X(l, i) + \text{Noise(total)} \quad \text{Equation 11}$$

The error term $e_{tr}(m,i)$, as calculated in Equation 9, is used to adapt the direct channel coefficients, cross channel coefficients, and the adaptive comb filter taps based on Equation 10 and Equation 6. To speed up the identification process, a training scheme where transmission of data from each user is synchronized and only one user transmits at any time instant during initialization. With this method, the direct channel coefficients can be initialized by $$H^i(m, m)(0) = \frac{Y_i^m(0)}{X(m, i)(0)} \quad \text{Equation 12}$$

and the cross channel coefficients can be initialized by $$H^i(m, l)(0) = \frac{Y_i^m(0)}{X(l, i)(0)} \quad \text{Equation 13}$$

Instead of viewing the time instant "0" as one time sample, it can be viewed as a group of symbols where the taps are calculated through an averaging method of multiple symbols.

Based on the initial channel tap values, a profiling of update step sizes could be formed, with larger initial values corresponding to relatively larger step sizes. The absolute values of the step sizes depend on the convergence speed required and the particular application. One method is to scale the initial values by a constant and then set restrictions on the maximum and minimum value allowed. For example, the value of the step size, $\mu^i(m,l)$, assigned to the tap, $H^i(m,l)$, can be computed from its initialized value as in Equation 14 or Equation 15

$$\mu^i(m,l) = K \cdot abs[H^i(m,l)(0)] \quad \text{Equation 14}$$

$$\mu^i(m,l) = K \cdot abs[H^i(m,l)(0)]^2 \quad \text{Equation 15}$$

where K is some constant less than 1. Subsequently, the step size value can be bounded as in the following equation.

$$\mu^i(m, l) = \begin{cases} K\_max & \text{if } \mu^i(m, l) > K\_max \\ K\_min & \text{if } \mu^i(m, l) < K\_min \end{cases} \quad \text{Equation 16}$$

In one embodiment, when most channel coefficients have well converged or during the tracking phase, the step size values can be further gear-shifted down as $$\mu^i(m,l) = K\_gear\_shift \quad \text{Equation 17}$$

where K_gear_shift is a value smaller than K_min.

If synchronization between users is not possible or all users have to transmit at the same time, the direct channel coefficients can still be initialized as the cross channel coefficients are of much smaller magnitude. In addition, when 4-QAM signals are used for training, the division required to initialize the coefficients can be easily implemented as a multiplication.

For channel coefficients tracking during data transmission, a decision directed method is used and the error signal is computed different from above in accordance with the following equation.

$$e_d(m,i) = X_d(m,i) - S_i^m \quad \text{Equation 18}$$

This decision error is appropriate to further adapt the adaptive filter coefficients and/or direct and cross channel coefficients. Such an error is derived through the FEXT canceller 516 instead of the FEXT estimator 514 as in the case for training. With reference to FIG. 5A, the decision error during data transmission is output by the subtractor 524 which performs the subtraction operation of Equation 18. Such an error is used to update the FEXT estimator 514 as well as the channel equalizer 504. After each update, the coefficients in the FEXT estimator 514 are exported to the FEXT canceller 516 for next updates. Such a scheme can be illustrated by FIG. 5A when the selectors 508 and 518 are enabled for data transmission.

If overlap spectrum between upstream and downstream is employed and NEXT noise cancellation is beneficial, the structure being used for direct and FEXT channel estimation can be at least partially reused for echo and NEXT channel estimation and echo and NEXT noise cancellation.

Figure 5B:
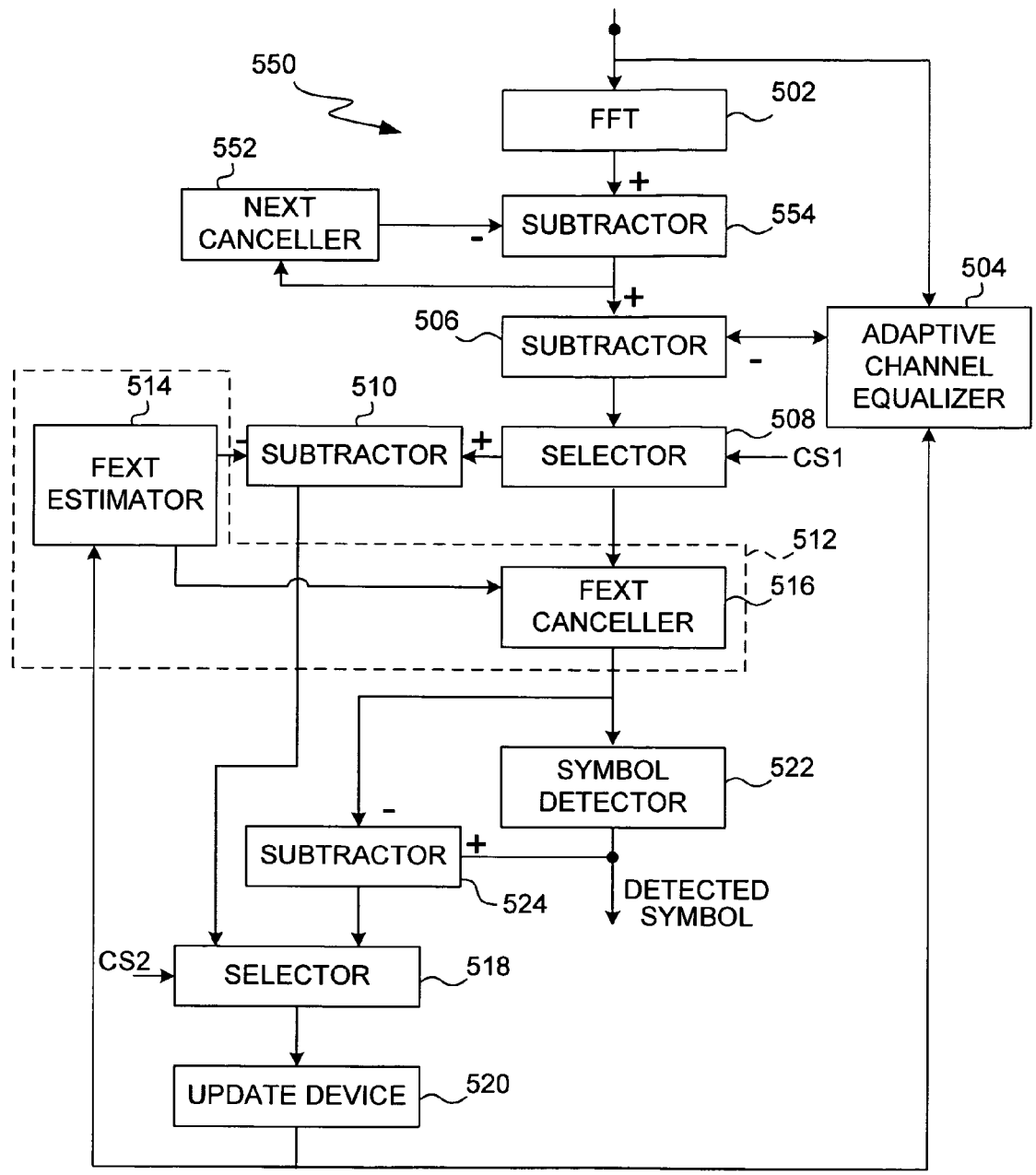
FIG. 5B is a block diagram of a multicarrier data transmission system according to another embodiment of the invention.

FIG. 5B is a block diagram of a multicarrier data transmission system 550 according to another embodiment of the invention. The multicarrier data transmission system 550 can, for example, represent a more detailed embodiment of the multicarrier data transmission system 400 illustrated in FIG. 4. The multicarrier data transmission system 550 is generally similar to the multicarrier data transmission system 500 illustrated in FIG. 5A, except that the multicarrier data transmission system 550 further includes a near-end crosstalk (NEXT) canceller 552 and a subtractor 554. The NEXT canceller 552 produces a NEXT interference estimate. The subtractor 554 subtracts the NEXT interference estimate provided by the NEXT canceller 552 from the frequency-domain symbols provided by the FFT 502. The NEXT canceller 552 also receives feedback from the output of the subtractor 554 so that the NEXT interference estimate can be adaptively updated. Hence, in this embodiment, the equalized symbols output by the subtractor 506 have been compensated for NEXT interference.

Figure 5C:
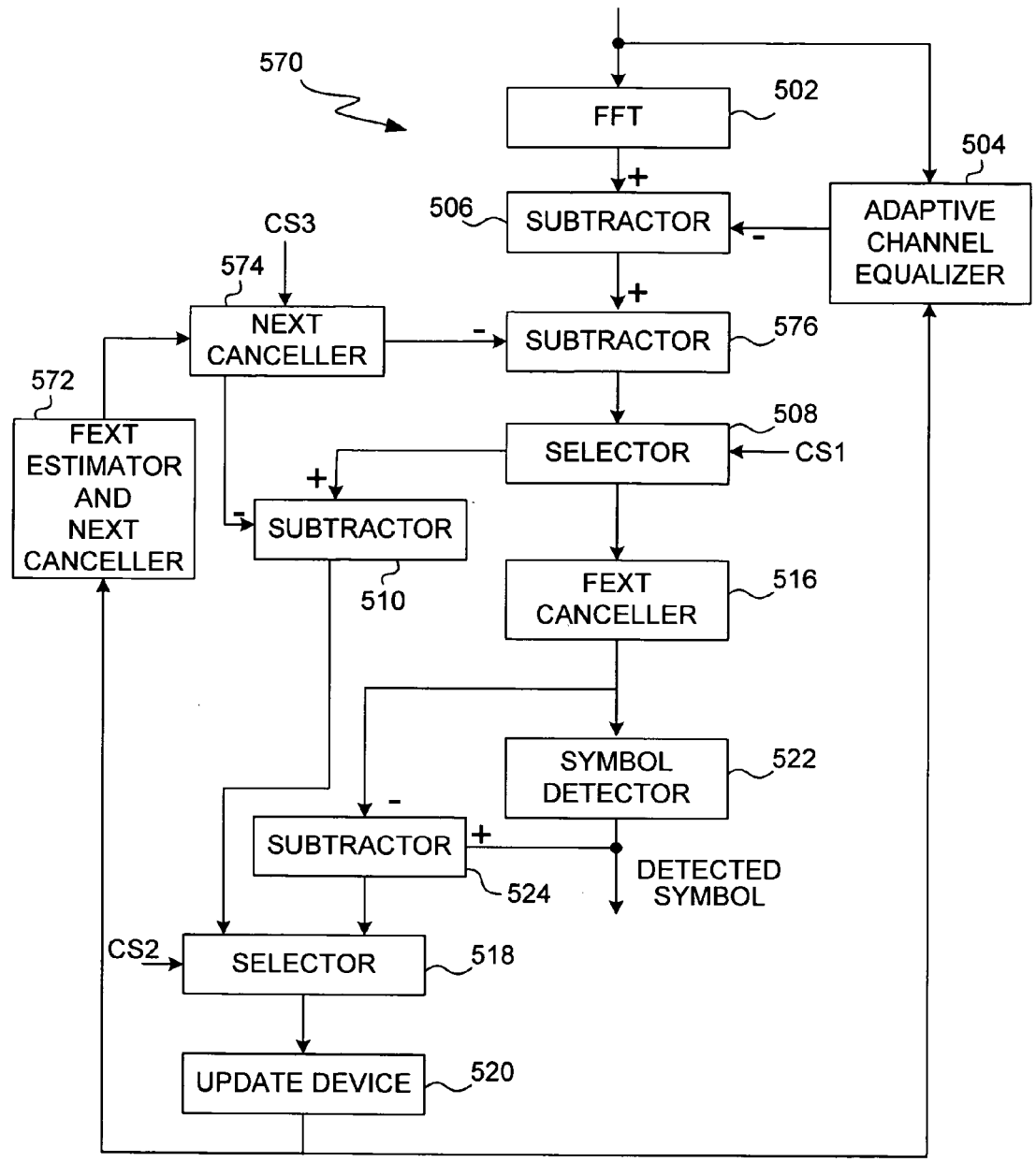
FIG. 5C is a block diagram of a multicarrier data transmission system according to another embodiment of the invention.

FIG. 5C is a block diagram of a multicarrier data transmission system 570 according to another embodiment of the invention. The multicarrier data transmission system 570 can, for example, represent a more detailed embodiment of the multicarrier data transmission system 400 illustrated in FIG. 4. The multicarrier data transmission system 570 is generally similar to the multicarrier data transmission system 500 illustrated in FIG. 5A, except that the multicarrier data transmission system 570 further includes a FEXT estimator and NEXT canceller 572, a selector 574, and a subtractor 576. The FEXT estimator and NEXT canceller 572 include a FEXT estimator and a NEXT canceller such that at least a portion of the hardware can be shared. The selector 574 is controlled by a third control signal (CS3) which can serve as a mode selection signal. In one embodiment, the third control signal (CS3) is the same signal as the first or second control signals (CS1 and CS2). In the first mode, the FEXT estimator and NEXT canceller 572 operate as a FEXT estimator, and the control signal (CS3) causes the selector 574 to supply the estimates pertaining to the FEXT interference from the FEXT estimator to the subtractor 510, thereafter the operation resembles that discussed above with reference to FIG. 5A. Hence, the FEXT estimator is trained in the first mode. In a second mode, the FEXT estimator and NEXT canceller 572 operates as a NEXT canceller. Here, the NEXT canceller is trained by using the control signal (CS3) to cause the selector 574 to supply a NEXT estimate from the NEXT canceller to the subtractor 576. Thereafter, in the third mode (i.e., data transfer mode), the FEXT canceller 516 operates in accordance with coefficients determined by the FEXT estimator, and the NEXT canceller operates in accordance with the NEXT estimate to perform NEXT cancellation at the subtractor 576. In one embodiment, the NEXT estimate can pertain to an echo and NEXT estimate.

Figure 5D:
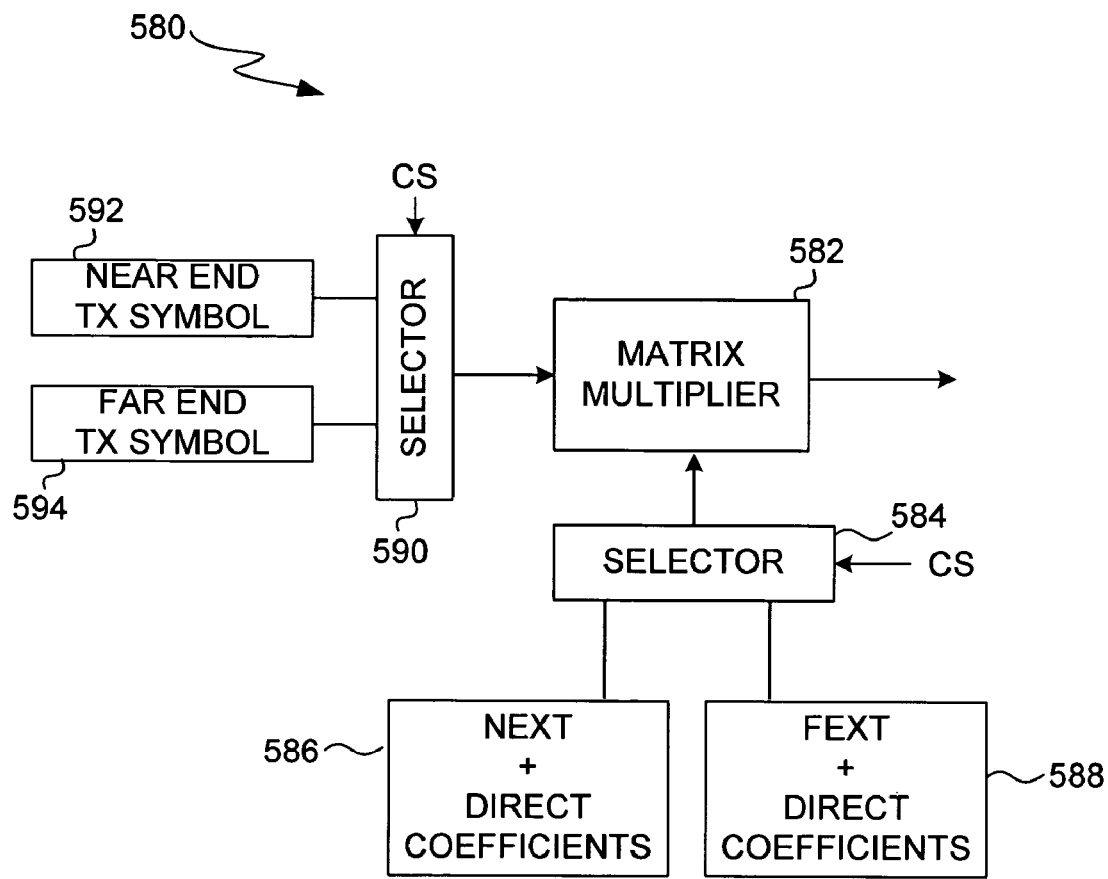
FIG. 5D is a block diagram of a FEXT estimator and NEXT canceller according to one embodiment of the invention.

FIG. 5D is a block diagram of a FEXT estimator and NEXT canceller 580 according to one embodiment of the invention. The FEXT estimator and NEXT canceller 580 is suitable for use as the FEXT estimator and NEXT canceller 572 illustrated in FIG. 5C. The FEXT estimator and NEXT canceller 580 include a matrix multiplier 582. One input to the matrix multiplier 582 is supplied by a selector 584. Under the control of a control signal (CS), the selector 584 supplies either NEXT and echo coefficients 586 or FEXT and direct coefficients 588 to the matrix multiplier 582. The NEXT and echo coefficients 586 and the FEXT and direct coefficients 588 can be adaptively updated during training or data transmission by an update device, such as the update device 520 illustrated in FIG. 5A. Another input to the matrix multiplier 582 is supplied by a selector 590. Under the control of the control signal (CS), the selector 590 supplies either near-end transmitted symbols 592 or far-end transmitted symbols 594 to the matrix multiplier 582. In this embodiment, the matrix multiplier 582 is shared and thus used for NEXT estimation, NEXT cancellation, and FEXT estimation.

Figure 6:
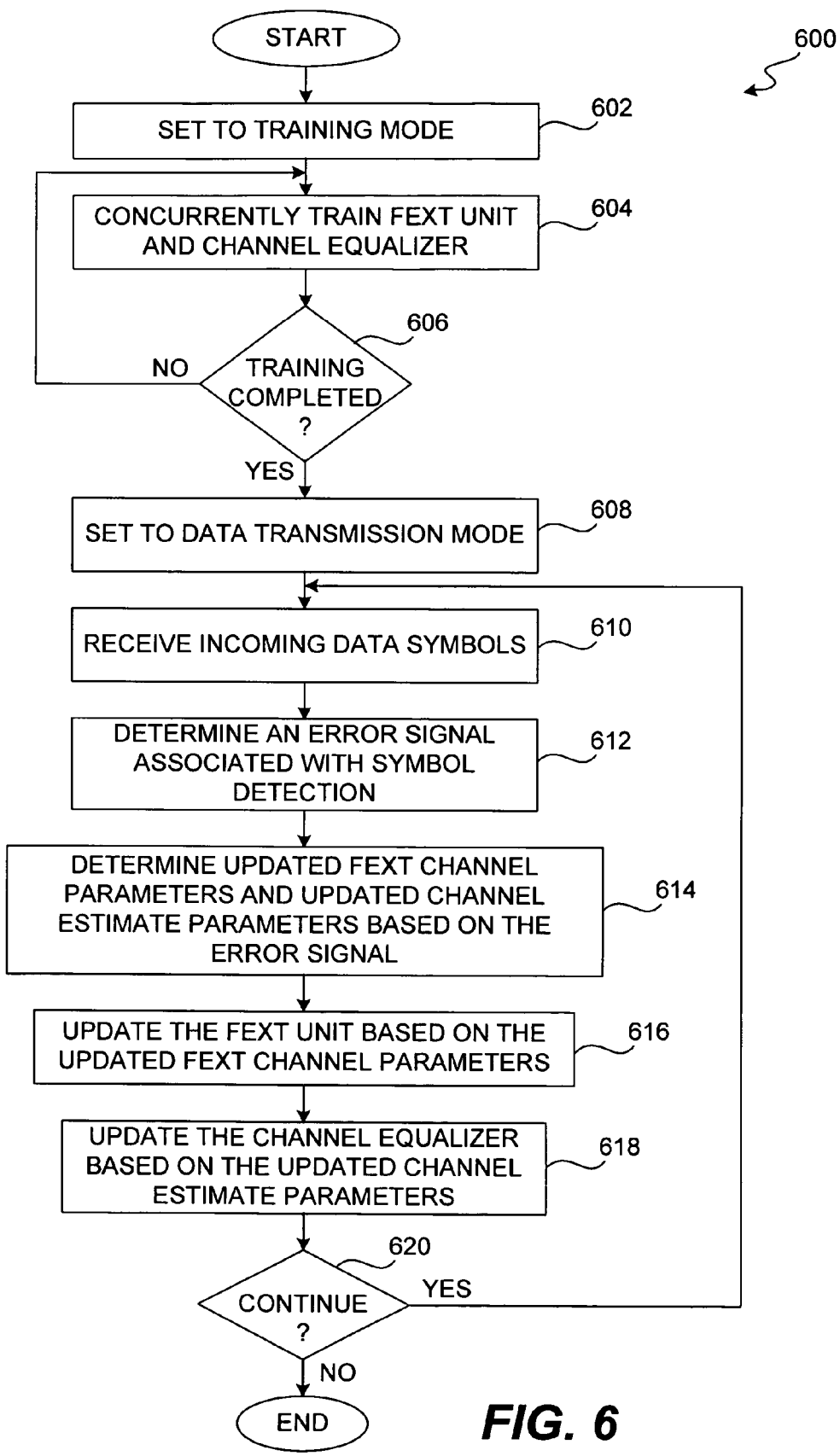
FIG. 6 is a flow diagram of an adaptive channel monitoring process according to one embodiment of the invention.

FIG. 6 is a flow diagram of an adaptive channel monitoring process 600 according to one embodiment of the invention. The adaptive channel monitoring process 600 is, for example, capable of being performed by the multicarrier data transmission system 400 illustrated in FIG. 4, the multicarrier data transmission system 500 illustrated in FIG. 5A, or the multicarrier data transmission system 550 illustrated in FIG. 5B.

The adaptive channel monitoring process 600 initially sets 602 a training mode. Here, the multicarrier data transmission system performing the adaptive channel monitoring process 600 has at least a training mode and a data (or data transfer) mode. Hence, the multicarrier data transmission system is set 602 to the training mode.

After the multicarrier data transmission system has been set 602 to the training mode, a FEXT unit and a channel equalizer are concurrently trained 604. By concurrently training the FEXT unit and the channel equalizer, an update process associated with such training can be performed in an efficient manner as well as in a more accurate manner. Next, a decision 606 determines whether training has been completed. When the decision 606 determines that training has not yet been completed, the adaptive channel monitoring process 600 returns to repeat the block 604 and subsequent blocks.

On the other hand, once the decision 606 determines that training has been completed, the multicarrier data transmission system is set 608 to a data transmission mode. Thereafter, incoming data symbols are received 610.

Next, an error signal is determined 612 for the associated symbol detection. The error signal pertains to an error amount that is present during symbol detection being performed on the incoming data symbols by the multicarrier data transmission system. In addition, updated FEXT channel parameters and updated channel estimate parameters are determined 614 (jointly) based on the error signal. After the updated FEXT channel parameters and the updated channel estimate parameters are determined 614, the FEXT unit is updated 616 based on the updated FEXT channel parameters. Also, the channel equalizer is updated 618 based on the updated channel estimate parameters. In one embodiment, the update 616 of the FEXT unit and the update 618 of the channel equalizer can be performed concurrently or substantially simultaneously.

After the FEXT unit has been updated 616 and the channel equalizer has been updated 618, a decision 620 determines whether the adaptive channel monitoring process 600 should continue. When the decision 620 determines that the adaptive channel monitoring process 600 should continue, then the adaptive channel monitoring process 600 returns to repeat the block 610 and subsequent blocks so that additional incoming data symbols can be similarly processed. Alternatively, when the decision 620 determines that the adaptive channel monitoring process 600 should not continue, then the adapted channel monitoring process 600 is complete and ends.

The cancellation of FEXT can also be implemented as a precoder in transmitter-coordinated systems. With such an approach, concurrent identification and tracking of direct and cross channels as discussed above can still be provided.

Figure 7A:
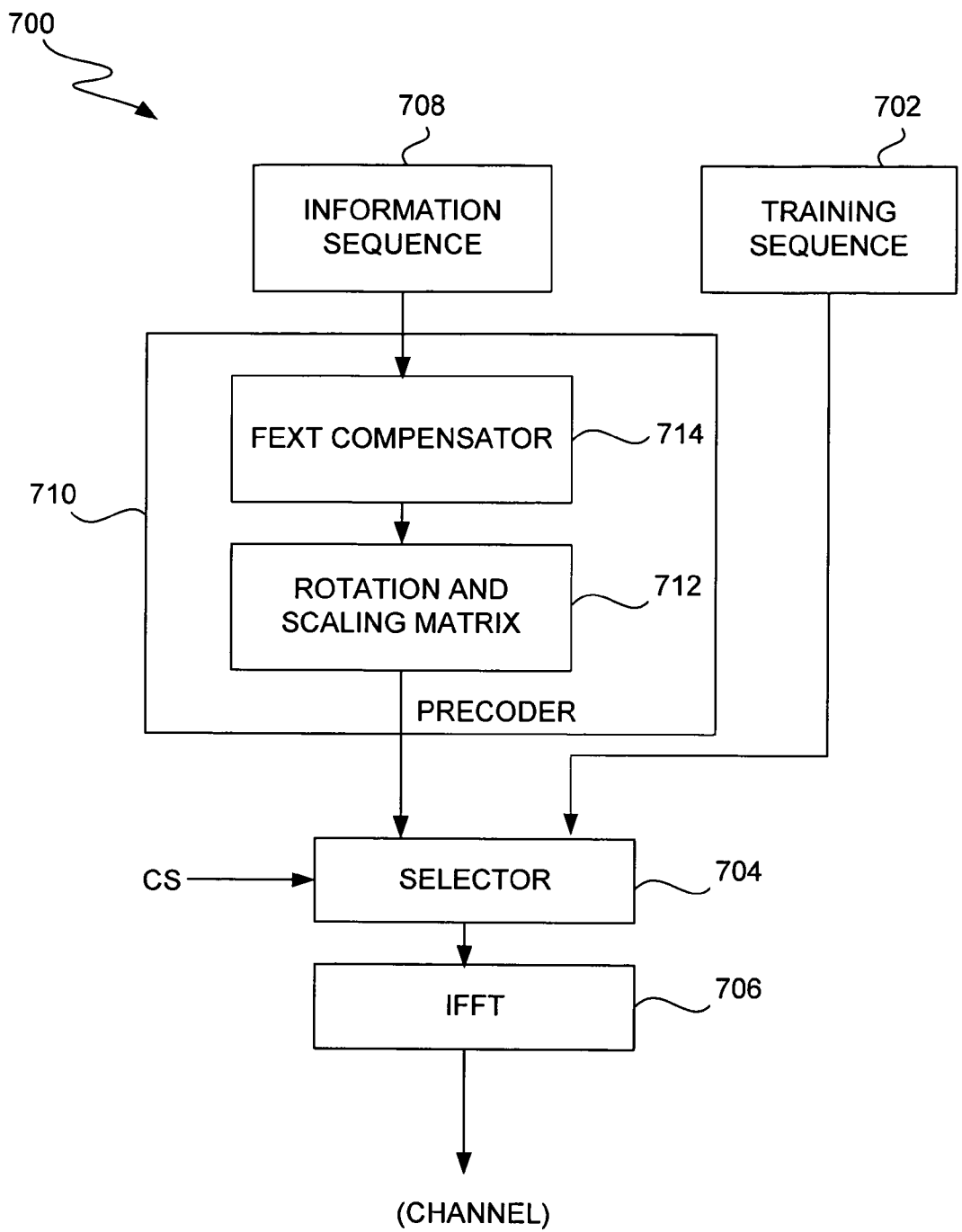
FIGS. 7A and 7B are block diagrams of a multicarrier data transmission system according to another embodiment of the invention.
Figure 7B:
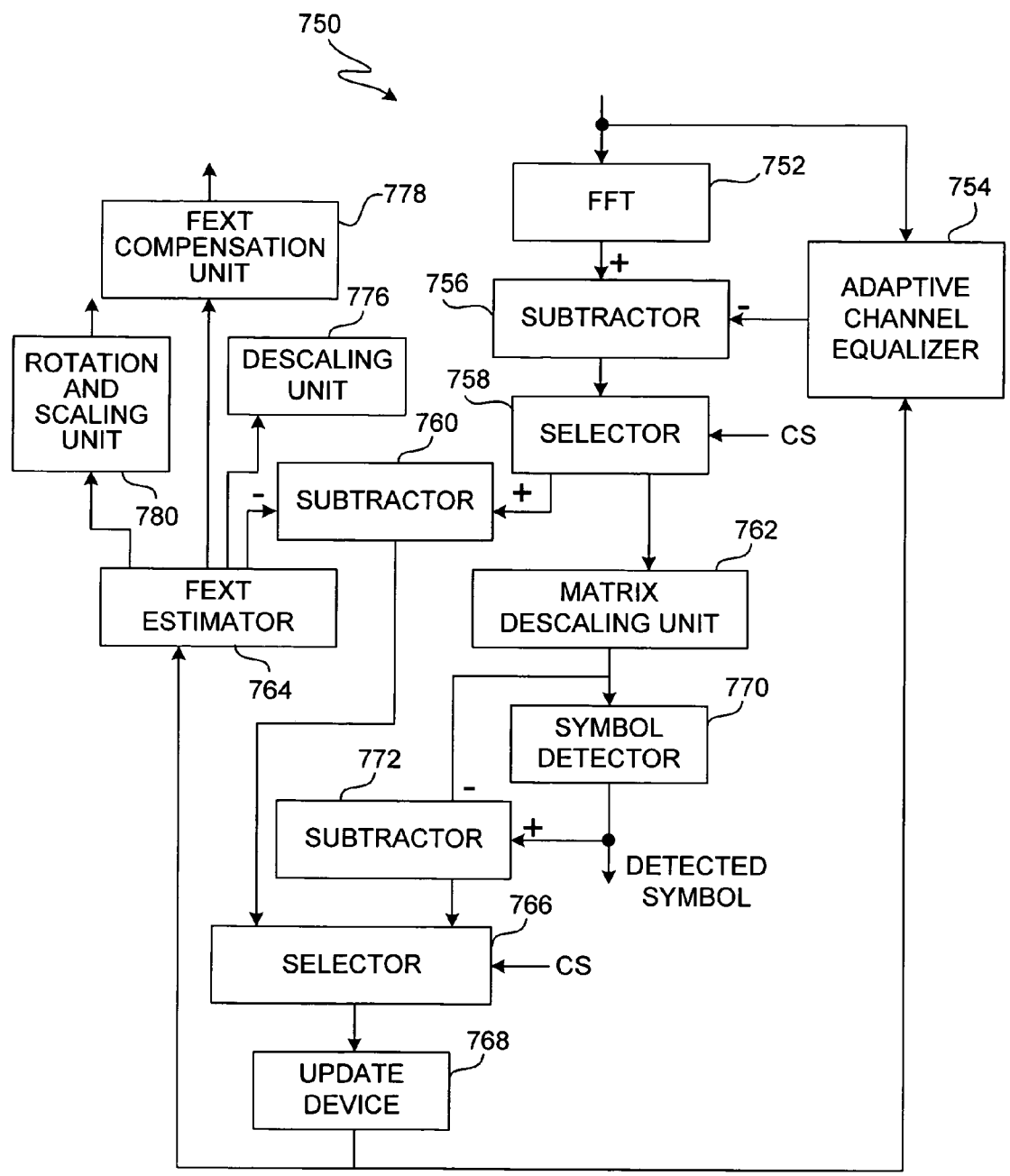

FIGS. 7A and 7B are block diagrams of a multicarrier data transmission system according to another embodiment of the invention. In this embodiment, the cancellation of FEXT interference is implemented as precoder on a transmission side of the multicarrier data transmission system.

FIG. 7A is a block diagram of a transmitter 700 of the multicarrier data transmission system. The transmitter 700 operates in a training mode to transmit a training sequence 702 over a channel to a receiver. The transmitter 700 includes a selector 704 that selects the training sequence 702 under the control of a control signal (CS). The output of the selector 704 is supplied to an Inverse Fast Fourier Transform (IFFT) 706. In a training mode, the selector 704 supplies the training sequence 702 to the IFFT 706. The IFFT 706 converts the frequency-domain symbols of the training sequence 702 into time-domain symbols which are transmitted over the channel to a receiver. Additionally, in a data transfer mode, an information sequence 708 is supplied to a precoder 710. The information sequence 708 represents coded data to be transmitted. However, prior to transmission, the precoder 710 manipulates the information sequence 708, which pertains to frequency-domain symbols, so that FEXT interference is cancelled. In this regard, the precoder 710 includes a FEXT compensator 714 and a rotation and scaling matrix 712. The FEXT compensator 714 compensates the normalized FEXT interference to the frequency-domain symbols to be transmitted and subsequently the rotation and scaling matrix 712 rotates the pre-compensated signals to account for the unitary matrix factor of the FEXT channel matrix. The selector 704, in the data transfer mode, selects the frequency-domain symbols output by the precoder 710. Again, the selector 704 is controlled using a control signal (CS). The frequency-domain symbols from the precoder 710, upon selection by the selector 704, are supplied to the IFFT 706 which outputs the time-domain symbols to be transmitted over the channel to the receiver.

FIG. 7B is a block diagram of a receiver 750 of the multicarrier data transmission system. The receiver 750 includes a fast Fourier transform (FFT) 752 that receives the incoming time-domain symbols that have been transmitted by the transmitter 700 over the channel to the receiver 750. The FFT 752 converts the incoming time-domain symbols into frequency-domain symbols.

An adaptive channel equalizer 754 determines a channel estimate for the channel based on the incoming time-domain symbols. A subtractor 756 subtracts the channel estimate provided by the adaptive channel equalizer 754 from the frequency-domain symbols provided by the FFT 752. The output of the subtractor 756 is equalized symbols. However, since the precoder 710 manipulated the symbols prior to transmission, the equalized symbols have, in effect, already undergone FEXT cancellation.

The receiver 750 also includes a selector 758, a subtractor 760 and a matrix descaling unit 762. The selector 758 operates under the control of a control signal (CS), which can serve as a mode selection signal. In one embodiment, the receiver 750 has a training mode and a data transfer mode. In the training mode, the selector 758 supplies the equalized symbols to the subtractor 760. In the data transfer mode, the selector 758 supplies the equalized symbols to the matrix descaling unit 762. The output of the matrix descaling unit 762 are estimated desired signals. The function of the matrix descaling unit 762 is to compensate the channel attenuation so that the equalized symbols are rescaled back to the QAM constellation grid and hence it acts like the frequency domain equalizer. The subtractor 760 receives a FEXT estimate from a FEXT estimator 764 during training. The subtractor 760 subtracts the FEXT estimate from the equalized symbols provided by the selector 758 to provide a training error signal.

The receiver 750 also includes a selector 766. The selector 766 receives the training error signal from the subtractor 760. The selector 766 operates under the control of a control signal (CS), which can serve as a mode selection signal. In the training mode, the control signal (CS) causes the selector 766 to output the training error signal to an update unit 768. The update unit 768 serves to perform an adaptive algorithm, such as the LMS algorithm, to reduce the training error signal. In one embodiment, the adaptive channel equalizer 754 is implemented by a filter having a plurality of taps, each of which is controlled by a coefficient, and the FEXT estimator 764 is implemented by a filter having a plurality of taps, each of which is controlled by a coefficient. In this regard, the update device 768 can operate to update coefficients to be used by the FEXT estimator 764 as well as coefficients to be used by the adaptive channel equalizer 754. Here, the update device 768 operates to jointly update the coefficients to be used by the FEXT estimator 764 as well as coefficients to be used by the adaptive channel equalizer 754.

In one embodiment, the coefficients used by the FEXT estimator 764 include at least one direct channel coefficient and cross channel coefficients. The receiver 750 further includes a symbol detector 770 and a subtractor 772. In the data transfer mode, the selector 758 supplies the equalized symbols to the matrix descaling unit 762, as opposed to the subtractor 760. The matrix descaling unit 762 scales the equalized symbols to compensate for channel attenuation. The matrix descaling unit 762 outputs estimated desired signals to the symbol detector 770. The symbol detector 770 examines the estimated desired symbol and outputs a detected symbol, for each of the estimated desired symbols. The subtractor 772 receives the estimated desired symbol provided by the matrix descaling unit 762 and the detected symbol output by the symbol detector 770. Hence, the subtractor 772 subtracts the estimated desired signal from the matrix descaling unit 762 from the detected symbol output by the symbol detector 770. The output of the subtractor 772 is an error signal that is supplied to the selector 766. In the data transfer mode, the control signal (CS) causes the selector 766 to provide the error signal from the subtractor 772 to the update device 768. As noted previously, the update device 768 serves to perform an adaptive algorithm, such as a LMS algorithm, to reduce the error signal. In this regard, the update device 768 can operate to update coefficients to be used by the FEXT estimator 764 as well as coefficients to be used by the adaptive channel equalizer 754. Hence, in the data transfer mode, the update device 768 also operates to jointly update the coefficients to be used by the FEXT estimator 764 as well as coefficients to be used by the adaptive channel equalizer 754.

Additionally, the receiver 750 includes a descaling unit 776, a FEXT compensation unit 778, and a rotation and scaling unit 780. The descaling unit 776 interacts with the FEXT estimator 764 so as to update coefficients utilized by the matrix descaling unit 762, in either the training mode or the data transfer mode. The FEXT compensation unit 778 interacts with the transmitter 700 to supply updated coefficients to the FEXT compensator 714. The rotation and scaling units 780 interacts with the transmitter 700 to provide rotation and scaling updates for the rotation and scaling matrix 712. In one embodiment, the interaction of the FEXT compensation unit 778 and the rotation and scaling unit 780 with the transmitter 700 can be performed using a parameter exchange protocol.

The invention can be implemented in software, hardware or a combination of hardware and software. The hardware can be custom circuitry, customized circuitry (ASIC) and/or general circuitry (e.g., digital signal processor). The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that separate electronic filters used to provide channel equalization and FEXT channel estimation and/or cancellation can be jointly updated in an adaptive manner. The joint adaptive update typically leads to improved accuracy and also faster convergence of coefficients for taps of the electronic filters. Another advantage of the invention is that resources for FEXT estimation and NEXT cancellation can be shared, which reduces implementation complexity.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A multicarrier data transmission system, comprising:
    a FFT unit that receives incoming time-domain symbols and outputs corresponding frequency-domain symbols;
    an adaptive channel equalizer that produces a noise estimate based on data associated with the incoming time-domain symbols, the noise estimate pertaining to at least inter-carrier interference and inter-symbol interference;
    a subtractor that subtracts the noise estimate from the frequency-domain symbols to produce channel adjusted symbols;
    a far-end crosstalk (FEXT) unit that adaptively determines FEXT channel coefficients and reduces FEXT from the channel adjusted symbols in accordance with the FEXT channel coefficients so as to produce desired symbols; and
    a symbol detector that examines the desired symbols to determine detected symbols.

2. A multicarrier data transmission system as recited in claim 1, wherein said FEXT unit compensates for far-end crosstalk and at least one of frequency equalization and channel attenuation.

3. A multicarrier data transmission system as recited in claim 1, wherein said multicarrier data transmission system further comprises:
    an adaptive update unit that performs an update algorithm that causes modification to both the FEXT channel coefficients and the noise estimate.

4. A multicarrier data transmission system as recited in claim 3, wherein the noise estimate is based on channel coefficients, and
    wherein said adaptive update unit causes the FEXT channel coefficients and the channel coefficients to be jointly optimized.

5. A multicarrier data transmission system as recited in claim 4, said multicarrier data transmission system further comprises:
    a subtractor that produces an error signal due to unwanted interference, and
    wherein said adaptive update unit causes the FEXT channel coefficients and the channel coefficients to be jointly updated based on the error signal.

6. A multicarrier data transmission system as recited in claim 5, wherein said FEXT unit includes a FEXT estimator and a FEXT canceller.

7. A multicarrier data transmission system as recited in claim 6, wherein said FEXT estimator and said FEXT canceller share a substantial portion of circuitry.

8. A multicarrier data transmission system as recited in claim 4, wherein said multicarrier data transmission system is operable in a training mode and a data mode, and
    wherein said adaptive channel equalizer and said FEXT unit are both operable in the training mode or the data mode so that said adaptive update unit causes the FEXT channel coefficients and the channel coefficients to be jointly updated in either the training mode or the data mode.

9. A multicarrier data transmission system as recited in claim 3, wherein said multicarrier data transmission system is operable in a training mode and a data mode, and
    wherein said multicarrier data transmission system further comprises:
    a first FEXT subtractor operable in the training mode to produce a first error signal due to unwanted interference;
    a second FEXT subtractor operable in the data mode to produce a second error signal based on differences between the desired symbols and the detected symbols; and
    wherein the adaptive update unit performs the update algorithm that causes modification to both the FEXT channel coefficients and the channel estimate based on one of the first error signal and the second error signal.

10. A multicarrier data transmission system as recited in claim 9, wherein said multicarrier data transmission system further comprises:
    a selector operatively connected to said first FEXT subtractor and said second FEXT subtractor, said selector controllably supplying one of the first error signal and the second error signal to said adaptive update unit.

11. A multicarrier data transmission system as recited in claim 9, wherein said multicarrier data transmission system further comprises:
    a first selector operatively connected to said first FEXT subtractor and said FEXT unit, said first selector controllably supplying the channel adjusted symbols to said first FEXT subtractor or said FEXT unit; and
    a second selector operatively connected to said first FEXT subtractor and said second FEXT subtractor, said second selector controllably supplying one of the first error signal and the second error signal to said adaptive update unit.

12. A multicarrier data transmission system as recited in claim 9, wherein said FEXT unit compensates for far-end crosstalk and at least one of frequency equalization and channel attenuation.

13. A multicarrier data transmission system as recited in claim 1, wherein said multicarrier data transmission system further comprises a NEXT canceller, said NEXT canceller using at least a portion of said FEXT unit, thereby sharing resources.

14. A multicarrier data transmission system as recited in claim 1, wherein said multicarrier data transmission system operates in a multiple-inputs multiple-outputs environment.

15. A multicarrier data transmission system as recited in claim 1, wherein said data associated with the incoming time-domain symbols are the time-domain symbols or the frequency-domain symbols.

16. A multicarrier data transmission system as recited in claim 1, wherein the FEXT channel coefficients include direct and cross channel coefficients.

17. A multicarrier data transmission system as recited in claim 1, wherein said multicarrier data transmission system further comprises a NEXT canceller that provides a NEXT interference estimate from the frequency-domain symbols provided by the FFT unit.

18. A multicarrier data transmission system as recited in claim 5, wherein the error signal is produced in accordance with:

$$e_{tr}(m, i) = Y_i^m - \sum_{l=1}^{L} H^i(m, l) \cdot X(l, i) - ACF_i^m$$

where Y is the received signal; ACF is the adaptive channel equalizer output; and H*X is the output of the FEXT unit; wherein m and l are user indexes and i is a selected frequency.

19. A multicarrier data transmission system as recited in claim 5, wherein the error signal is produced in accordance with:

$$e_d(m,i) = X_d(m,i) - S_i^m$$

where X is the output of the FEXT unit and S is the output of the symbol detector; wherein m is a user index and i is a selected frequency.

20. A multicarrier data transmission system, comprising:
a FFT unit that receives incoming time-domain symbols and outputs corresponding frequency-domain symbols;
an adaptive channel equalizer that produces a noise estimate based on data associated with the incoming time-domain symbols, the noise estimate pertaining to at least inter-carrier interference and inter-symbol interference;
a subtractor that subtracts the noise estimate from the frequency-domain symbols to produce channel adjusted symbols;
a far-end crosstalk (FEXT) estimator that adaptively determines FEXT channel coefficients;
a descaling unit that scales the channel adjusted symbols to produce desired symbols; and
a symbol detector that examines the desired symbols to determine detected symbols,
wherein the FEXT channel coefficients are used to produce scaling data, and wherein said descaling unit operates to scale the channel adjusted symbols in accordance with the scaling data.

21. A multicarrier data transmission system as recited in claim 20, wherein the FEXT channel coefficients are used to compensate for far-end crosstalk and at least one of frequency equalization and channel attenuation.

22. A multicarrier data transmission system as recited in claim 20, wherein said multicarrier data transmission system further comprises:
an adaptive update unit that performs an update algorithm that causes modification to both the FEXT channel coefficients and the noise estimate.

23. A multicarrier data transmission system as recited in claim 22, wherein the noise estimate is based on channel coefficients, and
wherein said adaptive update unit causes the FEXT channel coefficients and the channel coefficients to be jointly updated.

24. A multicarrier data transmission system as recited in claim 23, wherein said multicarrier data transmission system further includes a FEXT compensation unit that communicates with a precoder at a transmitter to provide FEXT compensation to symbols prior to transmission.

25. A multicarrier data transmission system as recited in claim 24, wherein said multicarrier data transmission system further includes a rotation and scaling unit that communicates with the precoder at the transmitter to provide at least one of rotation and scaling to symbols prior to transmission.

26. A multicarrier data transmission system as recited in claim 20, wherein said data associated with the incoming time-domain symbols are the time-domain symbols or the frequency-domain symbols.

27. A method for operating a multicarrier data transmission system, the method comprising:
receiving incoming time-domain symbols;
converting the incoming time-domain symbols into frequency-domain symbols;
producing a noise estimate based on data associated with the incoming time-domain symbols, the noise estimate pertaining to at least inter-carrier interference and inter-symbol interference;
subtracting the noise estimate from the frequency-domain symbols to produce channel adjusted symbols;
determining far-end crosstalk (FEXT) channel coefficients and reducing FEXT from the channel adjusted symbols in accordance with the FEXT channel coefficients so as to produce desired symbols; and
examining the desired symbols to determine detected symbols.

28. A method for operating a multicarrier data transmission system as recited in claim 27, wherein said determining compensates for far-end crosstalk and at least one of frequency equalization and channel attenuation.

29. A method for operating a multicarrier data transmission system as recited in claim 27, further comprising:
performing an update algorithm that causes modification to both the FEXT channel coefficients and the noise estimate.

30. A method for operating a multicarrier data transmission system as recited in claim 29, further comprising:
optimizing the FEXT channel coefficients and the noise estimate.

31. A method for operating a multicarrier data transmission system recited in claim 30, further comprising:
producing an error signal due to unwanted interference; and
updating the FEXT channel coefficient and the noise estimate based on the error signal.

32. A method for operating a multicarrier data transmission system as recited in claim 30, further comprising:

operating said multicarrier data transmission system in a training mode and a data mode; and updating the FEXT channel coefficient and the noise estimate in either the training mode or the data mode.

33. A method for operating a multicarrier data transmission system as recited in claim 32, wherein said operating operates in a multiple-inputs multiple-outputs environment.

34. A method for operating a multicarrier data transmission system as recited in claim 29, wherein said multicarrier data transmission system is operable in a training mode and a data mode, and wherein the method further comprises:

producing a first error signal due to unwanted interference;

producing a second error signal based on differences between the desired symbols and the detected symbols; and performing an update algorithm that causes modification to both the FEXT channel coefficients and the noise estimate based on one of the first error signal and the second error signal.

35. A method for operating a multicarrier data transmission system as recited in claim 34, further comprising:

selectively supplying one of the first error signal and the second error signal to an adaptive update unit.

36. A method for operating a multicarrier data transmission system as recited in claim 27, wherein said data associated with the incoming time-domain symbols are the time-domain symbols or the frequency-domain symbols.

37. A method for operating a multicarrier data transmission system as recited in claim 27, wherein the FEXT channel coefficients include direct and cross channel coefficients.

38. A method for operating a multicarrier data transmission system as recited in claim 27, further comprising:

providing a NEXT interference estimate from the frequency-domain symbols.

* * * * *